United States Patent
Zirwas et al.

(10) Patent No.: US 11,888,553 B2
(45) Date of Patent: Jan. 30, 2024

(54) MASSIVE MIMO ANTENNA ARRAY

(71) Applicant: NOKIA TECHNOLOGIES OY, Espoo (FI)

(72) Inventors: Wolfgang Zirwas, Munich (DE); Rakash Sivasiva Ganesan, Unterhaching (DE); Berthold Panzner, Holzkirchen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 38 days.

(21) Appl. No.: 17/766,864

(22) PCT Filed: Oct. 18, 2019

(86) PCT No.: PCT/EP2019/078354
§ 371 (c)(1),
(2) Date: Apr. 6, 2022

(87) PCT Pub. No.: WO2021/073751
PCT Pub. Date: Apr. 22, 2021

(65) Prior Publication Data
US 2023/0155638 A1    May 18, 2023

(51) Int. Cl.
*H04B 7/0426* (2017.01)
(52) U.S. Cl.
CPC .................. *H04B 7/0426* (2013.01)
(58) Field of Classification Search
CPC ............... H01J 37/32; H01J 37/32082; H01J 37/32146; H01J 37/32155; H01J 45/00;
(Continued)

(56) References Cited

U.S. PATENT DOCUMENTS 5,287,555 A * 2/1994 Wilson .................. H04W 52/36
330/278
6,051,284 A * 4/2000 Byrne ............... H01J 37/32082
134/1.1
(Continued)

FOREIGN PATENT DOCUMENTS

CN        101116140 A      1/2008
CN        101331503 A     12/2008
(Continued)

OTHER PUBLICATIONS

International Search Report and Written Opinion dated Jul. 27, 2020 corresponding to International Patent Application No. PCT/EP2019/078354.

(Continued)

*Primary Examiner* — James M Perez
(74) *Attorney, Agent, or Firm* — SQUIRE PATTON BOGGS (US) LLP

(57) ABSTRACT

Inter-alia, an apparatus is disclosed comprising: at least one power amplifier coupled to at least one radio frequency power storage device, wherein the at least one power amplifier is configured to supply power to the at least one radio frequency power storage device, wherein the at least one power amplifier provides power to be used to amplify one or more radio frequency signals; wherein the at least one radio frequency power storage device is configured to store the power of the at least one power amplifier for a certain time period; and one or more antenna elements coupled to the at least one radio frequency power storage device, wherein the at least one radio frequency power storage device is configured to output stored power to at least one of the one or more antenna elements, wherein the power is output variably dependent upon a power demand of a required radio frequency power and/or amplitude needed to transmit the one or more radio frequency signals, wherein the power (Continued)

demand represents a power demand of the at least one antenna element to which the power is to be output. It is further disclosed an according method, and system.

20 Claims, 5 Drawing Sheets

(58) Field of Classification Search
CPC .......... H04B 7/0426; H04B 2001/0408; H04B 2001/0416; H03G 2201/20; H03G 2201/208
See application file for complete search history.

(56) References Cited

U.S. PATENT DOCUMENTS

| | | | | |
|---|---|---|---|---|
| 7,110,730 | B2* | 9/2006 | Okada | H03F 1/30 455/108 |
| 8,498,539 | B1* | 7/2013 | Ilchenko | H04B 10/90 398/115 |
| 8,831,544 | B2* | 9/2014 | Walker | H03F 3/68 455/127.1 |
| 8,909,178 | B2* | 12/2014 | Fan | H03F 1/0211 455/127.1 |
| 11,070,240 | B1* | 7/2021 | Zalucki | H04B 1/0475 |
| 11,496,229 | B2* | 11/2022 | Patton | H04B 17/103 |
| 2003/0136766 | A1* | 7/2003 | Hoffman | H01J 37/32183 219/121.43 |
| 2003/0153285 | A1* | 8/2003 | Dekker | H04L 27/2626 455/104 |
| 2008/0271987 | A1* | 11/2008 | Noh | H05H 1/46 422/186.04 |
| 2009/0093225 | A1* | 4/2009 | Fan | H03G 3/3042 455/127.2 |
| 2010/0060456 | A1 | 3/2010 | Forster | |
| 2012/0236895 | A1* | 9/2012 | Miles | H01P 7/08 438/42 |
| 2013/0301454 | A1* | 11/2013 | Seol | H04B 7/0695 370/252 |
| 2014/0292080 | A1 | 10/2014 | Markowz et al. | |
| 2014/0316601 | A1 | 10/2014 | Markowz et al. | |
| 2015/0079915 | A1* | 3/2015 | Fan | H03G 3/004 455/127.2 |
| 2015/0255258 | A1* | 9/2015 | Nozawa | C23C 16/4584 118/723 MW |
| 2016/0295675 | A1* | 10/2016 | Yuzurihara | H01J 37/3299 |
| 2019/0036578 | A1* | 1/2019 | Zirwas | H04B 7/0469 |
| 2019/0393165 | A1* | 12/2019 | Radhakrishnan | H01L 21/4846 |
| 2020/0313711 | A1* | 10/2020 | Patton | H03F 3/24 |
| 2021/0027992 | A1* | 1/2021 | Funk | H03F 3/602 |
| 2021/0082666 | A1* | 3/2021 | Zhao | H01J 37/32183 |
| 2021/0249228 | A1* | 8/2021 | Van Zyl | H01J 37/32128 |
| 2021/0257321 | A1* | 8/2021 | Kim | H05K 1/181 |
| 2022/0189738 | A1* | 6/2022 | Evans | H01J 37/32183 |
| 2022/0230847 | A1* | 7/2022 | Heckman | H01J 37/32174 |
| 2022/0311358 | A1* | 9/2022 | Mahbub | H03F 3/45264 |
| 2022/0344132 | A1* | 10/2022 | Hsu | H01J 37/32229 |
| 2022/0367149 | A1* | 11/2022 | Funk | H01L 22/20 |
| 2023/0155638 | A1* | 5/2023 | Zirwas | H04B 7/0426 375/267 |
| 2023/0178868 | A1* | 6/2023 | Semnani | H01P 11/007 333/210 |
| 2023/0260753 | A1* | 8/2023 | Everts | H01J 37/32174 315/111.21 |

FOREIGN PATENT DOCUMENTS

| | | | |
|---|---|---|---|
| CN | 103825295 | A | 5/2014 |
| CN | 103916093 | A | 7/2014 |

OTHER PUBLICATIONS

B. Yu. Bogdanovich et al., "RF Pulses with Flat Output Waveform Generator in RF Power Upgrade System," Proceedings of the Particle Accelerator Conference, IEEE, vol. CONF. 14, May 6, 1991, pp. 1048-1050, XP010049948.

First Office Action dated Oct. 24, 2023 corresponding to Chinese Patent Application No. 201980101157.4, with English summary thereof.

* cited by examiner

MASSIVE MIMO ANTENNA ARRAY

FIELD

The following disclosure relates to the field of massive MIMO antenna arrays, or more particularly relates to apparatuses and methods for providing radio frequency power to one or more antenna elements.

BACKGROUND

Massive MIMO (Multiple Input Multiple Output) is and will be an essential part of future new radio (NR) cellular communication systems. From a business perspective, there is a challenge with respect to straight forward implementation of massive MIMO with one conventional RF chain per antenna element. For hundreds of antenna elements the cost, size and power consumption will be prohibitive for a wide scale deployment of massive MIMO antennas. Especially, the performance gain (e.g. spectral efficiency) of the massive MIMO antenna array is typically not increasing linearly with the number of antenna elements so that there is a bad tradeoff between complexity and cost versus performance gains.

For that reason, it is common understanding that massive MIMO antenna arrays need essential different implementation strategies, which generated for example a lot of research for one bit quantization schemes relying on many constrained radio frequency (RF) Front Ends (FEs). Another commonly assumed option is to use a hybrid beamforming scheme, in which the number of RF chains is smaller than the number of antenna elements, combined with some suitable analogue phase shifting and combining networks.

Furthermore, in the area of power added efficiency (PAE) of power amplifiers for such MIMO systems, envelope tracking amplifiers are known. Such envelope tracking is used in OFDM (Orthogonal Frequency-Division Multiplexing) signals with its strong peak to average power variations. Envelope tracking has some challenges like the need for a strong oversampling of the (e.g. data) signals to follow accurately the envelope of the transmission (Tx)-signal(s), which typically limits the possible transmission bandwidth. In addition, envelope tracking needs quite some processing effort with according power consumption. Due to the high number of Tx-antennas in MIMO systems, this extra power and cost for envelope tracking (as well as for analog to digital conversion (ADC), and digital to analogue conversion (DAC), etc.) has to be multiplied by the number of antenna elements so that the relative overhead becomes very large.

Envelope tracking achieves a PAE in the range of about 30% to best case 50%. These are already quite good values, but still this means that more than half of the Tx-power will be converted into heat, which then requires according sophisticated cooling concepts for the heat that is generated by the used power (e.g. hundred to several hundreds of watts) in the base stations. In addition, this requires much electrical power for the required cooling.

Known massive MIMO antennas respectively antenna arrays consume significantly more power than e.g. 2×2 MIMO systems. For mobile respective cellular network operators, the power costs are in the meantime a significant part of their operating expenses (OPEX) and for some operators, the power costs are even one of the most important key performance indicators (KPIs).

For the adaptation of the power consumption to varying load levels, it is known to switch on and off certain antenna elements, or more importantly the related radio frequency chains. This is not for free as it will affect the Tx-beamforming gains as well as the beamforming patterns. Accordingly, the beamforming efficiency decreases leading to a higher Tx-power per data stream compared to an ideal fully active massive MIMO antenna array.

SUMMARY OF SOME EXEMPLARY EMBODIMENTS

However, known solutions do not provide a high power added efficiency (PAE) for a power amplifier of a massive MIMO gNB (also referred to as gNodeB) base station as part of a integrated radio frequency unit design while being in particular processing and/or power consuming efficient. Further, known solutions do not enable a fine granular adaptation of the power consumption.

It is thus, inter alia, an object of the invention to reduce or minimize the known drawbacks, and to achieve a high PAE in powering antennas (e.g. of a massive MIMO gNB), in particular in combination with an efficient massive MIMO antenna array implementation.

According to a first exemplary aspect of the present invention, an apparatus is disclosed, the apparatus comprising:

at least one power amplifier coupled to at least one radio frequency power storage device, wherein the at least one power amplifier is configured to supply power to the at least one radio frequency power storage device, wherein the at least one power amplifier provides power to be used to amplify one or more radio frequency signals;

wherein the at least one radio frequency power storage device is configured to store the power of the at least one power amplifier for a certain time period; and one or more antenna elements coupled to the at least one radio frequency power storage device, wherein the at least one radio frequency power storage device is configured to output stored power to at least one of the one or more antenna elements, wherein the power is output variably dependent upon a power demand of a required radio frequency power and/or amplitude needed to transmit the one or more radio frequency signals, wherein the power demand represents a power demand of the at least one antenna element to which the power is to be output.

This apparatus may for instance be a base station (e.g. a gNodeB, gNB, to name but one non-limiting example), or a module, e.g. to be comprised by such a base station. This apparatus may for instance be a part or be comprised by a cellular respectively mobile communication network, e.g. according to 5G, NR (New Radio), Converged 5G (C5G+), or a combination thereof, to name but a few non-limiting examples, communication standards.

The 2G/3G/4G/5G/C5G+ communication standards are developed by the 3GPP and presently available under http://www.3gpp.org/.

According to a second exemplary aspect of the present invention, a method is disclosed, the method comprising:

supplying power to means for storing radio frequency power, wherein the power is provided to the means for storing radio frequency power to be used to amplify one or more radio frequency signals;

storing the power for a certain time period; and outputting stored power to at least one means for transmitting the one or more radio frequency signals, wherein the power is output variably dependent upon a power demand of a required radio frequency power and/or amplitude needed to transmit the one or more radio frequency signals, wherein the power demand represents a power demand of the at least one means for transmitting the one or more radio frequency signals to which the power is to be output.

This method may for instance be performed and/or controlled by an apparatus, for instance a base station (e.g. a gNodeB, gNB, to name but one non-limiting example). The apparatus may for instance be configured according to the first exemplary aspect of the present invention. Alternatively, this method may for instance be performed and/or controlled by a module, for instance to be comprised by a base station (e.g. a gNodeB, gNB, to name but one non-limiting example). This method may be performed and/or controlled by more than one apparatus, for instance a system comprising a plurality (e.g. at least two) apparatuses according to the first exemplary aspect of the present invention. Such a system may for instance comprise a plurality (e.g. at least two) of modules, as disclosed above.

According to a further exemplary aspect of the present invention, a radio frequency power storage device for at least one power amplifier, in particular at least one power amplifier for an antenna array is disclosed, the radio frequency power storage device, comprising:

a containment for storing radio frequency power, wherein the containment is being achieved by at least two gases with different diffraction coefficients, wherein the at least two gases are separated by means for separating the at least two gases.

This radio frequency power storage device may for instance be comprised by or be a part of or be utilized by the apparatus according to the first exemplary aspect of the present invention, as disclosed above. Additionally or alternatively, this radio frequency power storage device may for instance be used or utilized by a method according to the second exemplary aspect of the present invention, as disclosed above.

According to a further exemplary aspect of the invention, a computer program is disclosed, the computer program when executed by a processor causing an apparatus, for instance the apparatus according to the first exemplary aspect of the present invention, or one or more functional and/or structural means comprised by such an apparatus to perform and/or control the steps respectively actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect, or for controlling one or more functional and/or structural means comprised by such an apparatus to perform and/or control the steps respectively actions of the method according to the second exemplary aspect.

The means of the apparatus can be implemented in hardware and/or software. Alternatively or additionally, the means of the apparatus can be controlled by hardware and/or software. They may comprise for instance at least one processor for executing computer program code for performing the required functions, and/or controlling the respective means, at least one memory storing the program code, or both. Alternatively, they could comprise for instance circuitry that is designed to implement the required functions, and/or for controlling the respective means, for instance implemented in a chipset or a chip, like an integrated circuit. In general, the means may comprise for instance one or more processing means or processors.

The above-disclosed apparatus according to any aspect of the invention may be a module or a component for a device (e.g. a base station), for example a chip. Alternatively, the hardware and/or software for performing the required functions, and/or controlling the respective means, may be a module or a component for a device, for example a chip. Alternatively, the disclosed apparatus according to any aspect of the invention may be a device. The disclosed apparatus according to any aspect of the invention may comprise only the disclosed components, for instance means, power amplifier, radio frequency storage device, antenna element(s), or processor, memory, or may further comprise one or more additional components.

According to a further exemplary aspect of the invention, a system is disclosed, comprising: an apparatus according to any aspect of the invention as disclosed above, and at least one mobile device, wherein the at least one mobile device is configured to receive one or more signals output by the apparatus.

Such a mobile device may for instance be portable (e.g. weigh less than 5, 4, 3, 2, or 1 kg). The mobile device may for instance comprise or be connectable to a display for displaying information. The mobile device may for instance comprise or be connectable to means for outputting sound, e.g. in the form of spoken commands or information. The mobile device may for instance comprise or be connectable to one or more sensors for determining the devices position, such as for instance a GNSS receiver, in the form of a GPS receiver. The mobile device may for instance comprise to be connectable to one or more sensors, e.g. in the form of an accelerometer and/or a gyroscope for gathering (e.g. measuring) further information. The mobile device may for instance comprise or be connectable to a receiver and/or a transmitter (e.g. a transceiver) for receiving and/or sending information.

In the following, exemplary features and exemplary embodiments of all aspects of the present invention will be described in further detail.

The solution according to the invention enables outperforming designs known from the prior art. The main target scenario may for instance be a 5G, or C5G+ new radio mobile communication system for below or above 6 GHz radio frequency bands.

The solution according to all aspects of the present invention enables to provide better power added efficiency compared to e.g. envelope tracking (power amplifier) concepts. Especially, better than 50% PAE is possible to achieve in case of a proper overall implementation. Further, optimum Tx-power adaptation to network load conditions without sacrificing beamforming capabilities as otherwise usual for radio frequency chain deactivation concepts is achievable. This maximizes the power saving compared to known solutions where the beamforming gains will suffer from a reduced number of active antenna elements.

The apparatus according to the first exemplary aspect of the present invention may for instance represents leakage buffer massive for or being comprised by a MIMO system respectively antenna array. The apparatus may for instance enable a novel concept for massive MIMO power amplifier(s) e.g. in base stations (e.g. gNodeB; gNB) having a high power added efficiency. For instance, a respective radio frequency power amplifier comprised by the apparatus according to the first exemplary aspect of the present invention may for instance be connected at one side to a (e.g. single) power storage device, which is connected e.g. at its output side to one or more antennas respectively antenna elements, wherein the respective antenna outputs of the one or more antenna elements are configured to be controlled individually, e.g. varied.

Such an apparatus according to the first exemplary aspect of the present invention enables e.g. a central amplifier to feed the at least one radio frequency power storage (device) with the highest possible power efficiency. Based on varying load conditions at the outputs (e.g. outlets connected to the one or more antenna elements), the power that is fed into the storage can be adapted, while general antenna characteristics can remain constant.

A respective antenna element (herein, also referred to as antenna) of the one or more antenna elements may for instance be a type of radiating element enabling to radiate energy out into space. Such a respective antenna element may for instance comprise or represent a dipole, to name but one non-limiting example.

In one exemplary embodiment according to all aspects of the present invention, the at least one radio frequency storage device (e.g. a radio frequency power containment, such as a cavity resonator) comprises respectively uses at least two gases having different diffraction coefficients to further enhance the efficiency of the such base stations (e.g. an apparatus or comprising an apparatus according to the first exemplary aspect of the present invention). More details are disclosed in the following part of this specification.

The one or more radio frequency signals may for instance be Tx (Transmit)-signals. Such Tx-signals are to be transmitted (e.g. radiated) by the one or more antenna elements.

Such one or more radio frequency signals may be characterized by a frequency, a frequency band, a frequency channel, or combination thereof. When a radio frequency signal is characterized by a frequency, it is understood to mean that this radio frequency signal may be transmitted and/or received at this frequency. A frequency band is an interval in the frequency domain, delimited by a lower frequency and an upper frequency. Such a frequency band may for instance be a 20 MHz LTE (Longterm Evolution), or 5G, or C5G+ frequency band. When a radio frequency signal is characterized by a frequency band, it is understood to mean that the radio frequency signal may be transmitted and/or received at any frequency included in the frequency band. Examples of different frequency bands are e.g. 2G bands (e.g. from 824 to 894 MHz or from 870 to 960 MHz), 3G bands (e.g. from 1920 to 2170 MHz), 4G bands (e.g. from 1710 to 1880 MHz), 5G and/or C5G+ bands (e.g. from 600 MHz to 6 GHz), to name but a few non-limiting examples. A respective radio frequency signal of the one or more radio frequency signals may for instance be used to transmit or receive one or more pieces of information. A respective radio frequency signal of the one or more radio frequency signals may for instance be or comprise a useful signal.

The one or more antenna elements are coupled to the at least one radio frequency power storage device. The at least one radio frequency power storage device may for instance comprise one or more outlets to be coupled to the one or more antenna elements. The at least one radio frequency power storage device outputs stored radio frequency power to at least one of the one or more antenna elements. Thus, the at least one radio frequency power storage may for instance be able to store (e.g. radio frequency) power for one or more radio frequency signals over a certain time duration, e.g. until the stored power for the one or more radio frequency signals may for instance be output to at least one of the one or more antenna elements. While storing the power for the one or more radio frequency signals, the stored power for one or more radio frequency signals is subject to power losses. Thus, the power for one or more radio frequency signals needs to be stored with lowest power losses for the certain time duration. For instance, power for a 3.5 GHz radio frequency signal is stored by the at least one radio frequency power storage device. Such a radio frequency signal may for instance have a bandwidth of 20 MHz. Thus, the 3.5 GHz radio frequency signal may for instance be a 20 MHz LTE signal. Such a radio frequency signal may for instance have a sampling time of e.g. 33 ns in the case of a LTE signal. Further, a symbol duration of e.g. 70 μs may for instance be used to transmit e.g. data via the 3.5 GHz radio frequency signal. To determine a minimum radio frequency storage time, the at least one at least one radio frequency power storage device may for instance be enabled to store the 3.5 GHz radio frequency signal respectively the power necessary for this signal at least for several symbol length, e.g. N×33 ns, where N is in the range of e.g. 2 to 10, to name but a few non-limiting examples. Thus, the certain time duration may for instance be equal or be larger than such a minimum radio frequency storage time, e.g. of 330 ns for N=10 in the aforementioned example. To enable the at least one radio frequency storage device to store power for such a radio frequency signal for the certain time duration of a full symbol length, it is required to store the power for the respective radio frequency signal for 70 μs, in the case of the aforementioned example. Due to unavoidable power losses occurring to a stored power for the respective radio frequency signal, this may be challenging to achieve, since the power losses are subject in particular to the so-called skin effect.

The skin effect within the meaning of the present invention relates to a power dissipation that occurs at a surface of the at least one radio frequency storage device (e.g. a cavity resonator), since a radio frequency signal becomes distributed such that the (e.g. current) density is largest near or at the surface. More details with respect to embodiments suitable for such a radio frequency storage device are given in the following of this specification.

The power is output e.g. via one or more power outlets connecting the at least one radio frequency power storage device to at least one antenna element of the one or more antenna element. The radio frequency power can be output variably dependent upon one or more parameters indicative of a required radio frequency power and/or amplitude of the one or more antenna elements (or at least one antenna element of the one or more antenna elements).

The one or more parameters may for instance be indicative of a radio frequency power and/or amplitude needed to transmit the one or more radio frequency signals. This power demand of the one or more antenna elements respective at least one antenna element of the one or more antenna elements can vary, e.g. dependent upon load conditions and/or channel conditions for the transmission of the one or more radio frequency signals, e.g. to one or more mobile devices. The one or more parameters may for instance be indicative of such load conditions and/or channel conditions for the transmission of the one or more radio frequency signals. The one or more parameters may for instance be determined (e.g. calculated) by a control unit. Such a control unit may for instance be comprised by the apparatus according to the first exemplary aspect of the present invention. Such a control unit may for instance be connected (e.g. electrically coupled) to the one or more antenna elements so that the control unit is enabled to determine the one or more parameters.

The power output of the at least one radio frequency power storage device may for instance be controllable, e.g. by at least one radio frequency power storage device comprising one or more outlets that are controllable and/or by the control unit. Such one or more outlets may for instance be coupled (e.g. connected) to the one or more antenna elements. For instance, the at least one of the one or more antenna elements may for instance be e.g. a slot antenna. Such a slot antenna may for instance have one or more slots of suitable size e.g. for a 3.5 GHz radio frequency signal in the aforementioned example. Such a radio frequency signal may for instance be just suitably placed in a radio frequency cavity of the respective slot antenna.

The PAE may for instance be influenced by a quality factor of the at least one radio frequency storage device. Thus, optimizing the quality factor of the at least one radio frequency storage device may for instance enable respectively ensure proper implementation of the present invention. For instance, for metallic cavities as being suitable for the at least one radio frequency storage device, the frequency dependent skin effect is considered to be a major issue for power losses of stored radio frequency power (e.g. for one or more radio frequency signals; e.g. a 3.5 GHz LTE signal, to name but one non-limiting example). In principle, super conductivity may for instance be suitable to achieve very high quality factors, since a super conductivity more or less overcomes the skin effect. Such super conductivities require strong cooling with according high power consumption. Since power consumption is another issue for mobile network operators in a base station, e.g. comprising an apparatus according to the first exemplary aspect of the present invention, such super conductivities do not seem to be the first choice implementation yet due the requirement of the high power consumption cooling.

The at least one radio frequency power storage device may for instance be of a metallic material. The at least one radio frequency power storage device may for instance have a cavity. Such a cavity may for instance be filled with a certain medium, e.g. air or gas. Further, the material of such a cavity may for instance be varied. For instance, the material of the cavity may be copper. Such copper cavities may for instance enable very good quality factors without the requirement of high power consumption cooling, to name but one non-limiting example.

A quality factor Q of the at least one radio frequency power storage device is indicative of a rate of energy loss relative to the stored power. Thus, a higher quality factor Q represents a lower rate of power loss, and compared to this, a lower quality factor Q represents a higher rate of power loss relative to the stored energy, e.g. of a resonator.

According to an exemplary embodiment of all exemplary aspects of the present invention, the at least one power amplifier supplies a constant power input to the at least one radio frequency power storage, wherein the power input is constant at least for a pre-determined or determined to pre-defined rules time interval.

According to an exemplary embodiment of all exemplary aspects of the present invention, the power supplied to the means for storing radio frequency power is a constant power input to the means for storing radio frequency power, wherein the power input is constant at least for a pre-determined or determined to pre-defined rules time interval.

The time interval may for instance be a time span, or time duration to name but a few non-limiting examples. The time interval may for instance be adapted, e.g. according to one or more rules. Such rules may for instance be pre-defined. For instance, such a rule may be indicative of a power demand that has occurred at the one or more antenna elements, e.g. representing a historic power demand.

The determined power demand may for instance then be used to determine the time interval. It will be understood that in order to supply the constant power input, the determined time interval may for instance be associated with a respective power, so that the at least one power amplifier may for instance supply the corresponding power for the duration of the time interval.

It will be understood that the constant power input may for instance be at least constant for the duration of the time interval. Thus, the power input can be varied, but on a lower time scale than e.g. the variation of the power output of the at least one radio frequency power storage device.

In this way, the at least one radio frequency power storage devices may for instance enable a leakage buffer due to the constant power input, but variable power output. Further, it may for instance be enabled a fine granular adaptation of the overall power consumption e.g. to the current load levels, or load levels that occurred during similar conditions (e.g. for the duration of a certain time interval, to name but one few non-limiting example). To name but one non-limiting example, an adaptation of the overall power consumption may for instance be performed and/or controlled on a much faster time scale than minutes, hours or days.

According to an exemplary embodiment of all exemplary aspects of the present invention, each of the one or more radio frequency signals is to be transmitted based on one or more symbols (e.g. to one or more mobile devices).

Such a symbol may be understood to be a state of a communication channel that is used to transmit the one or more radio frequency signals comprising or representing one or more symbols. To transmit a respective symbol, the apparatus according to the first exemplary aspect may for instance transmit the respective symbol on the channel at a fixed place, and at a fixed and/or known symbol rate. In this way, a receiver is enabled to receive the symbols and decode the symbols to get the transmitted information.

According to an exemplary embodiment of all exemplary aspects of the present invention, the at least one radio frequency power storage device enables storing of (e.g. radio frequency) power for one or more symbols or a certain time duration.

According to an exemplary embodiment of all exemplary aspects of the present invention, (e.g. radio frequency) power for one or more symbols is stored by the means for storing radio frequency power for a certain time duration.

The at least one radio frequency power storage device may for instance store (e.g. radio frequency) power for the one or more symbols which may for instance be used to transmit the one or more radio frequency signals.

Such (e.g. radio frequency) power stored by the at least one radio frequency power storage device may for instance be utilized to convert a low-power radio-frequency signal (e.g. of the one or more radio frequency signals) into a higher power signal.

The at least one radio frequency storage device may for instance be or comprise one or more cavities with a larger volume compared to its surface. As a result, the relation of the power dissipation at the surface due to the skin effect related to the stored radio frequency power can be reduced respectively minimized. Thus, the at least one radio frequency storage device may for instance be configured accordingly, e.g. comprising a cavity having a volume that is e.g. maximized with respect to the required surface. In this way, power loss(es) due to the skin effect can be reduced or minimized. Further, this enables a longer time duration for storing radio frequency power (e.g. of one or more radio frequency signals) due to lower power loss(es).

According to an exemplary embodiment of all exemplary aspects of the present invention, the at least one power amplifier supplies constant radio frequency power at least partially based on an average power demand power (e.g. of the one or more signals (e.g. Tx-signals) to be transmitted) of the one or more antenna elements.

According to an exemplary embodiment of all exemplary aspects of the present invention, the power is supplied as a constant radio frequency power at least partially based on an average power demand of the one or more antenna elements.

The average power demand of the one or more antenna elements may for instance be determined based on previous/historic power requirements respectively power demand(s) of the one or more antenna elements.

For instance, a control unit that is optionally comprised by the apparatus according to the first exemplary aspect of the present invention, may for instance gather (e.g. measure) the power demand, e.g. over a certain time interval, e.g. a time interval corresponding to a time scale faster than minutes on which a power demand adaptation may for instance be performed and/or controlled, to name but a few non-limiting examples. Additionally or alternatively, the power demand may for instance be gathered (e.g. measured) with respect to a certain time of the day. For instance, it may be gathered that a power demand of the one or more antenna elements is e.g. higher in the evening than it is in the morning, to name but one non-limiting example.

The power of the at least one power amplifier that is supplied to the at least one radio frequency power storage device may for instance be adapted or varied. For instance, the radio frequency power received by the at least one radio frequency power storage device from the at least one power amplifier may for instance enable a constant level of radio frequency power to be input into respectively received by the at least one radio frequency power storage device. The constant radio frequency power input may for instance be corresponding to the determined average power demand of the one or more antenna elements. Then, e.g. at least for a/the pre-defined time interval, the at least one power amplifier may for instance provide the respective radio frequency power to the at least one radio frequency power storage device.

Thus, the control unit may for instance be configured to control the at least one power amplifier. The control unit may for instance be configured to control the radio frequency power that is provided from the at least one power amplifier to the at least one radio frequency power storage device. The control unit may for instance be configured to control a time duration during which the at least one power amplifier may for instance supply a constant radio frequency power input to the at least one radio frequency power storage device. For instance, the control unit may for instance sent a control information indicative of a power demand and/or average power demand of the one or more antenna elements to the at least one power amplifier. Further, the control information may for instance be comprised by or be a part of the one or more parameters. Then, the at least one power amplifier may for instance supply a constant radio frequency power, e.g. for a certain time interval, to the at least one radio frequency power.

According to an exemplary embodiment of all exemplary aspects of the present invention, at least a part of the one or more antenna elements forms at least one column of antenna elements, which are coupled via the at least one radio frequency power storage device to the at least one power amplifier.

According to an exemplary embodiment of all exemplary aspects of the present invention, at least a part of the one or more antenna elements forms at least one column of antenna elements, wherein the column comprising one or more antenna elements is supplied with power by the means for storing radio frequency power.

Such a column, as used herein, refers to a plurality (e.g. at least two) of antenna elements, wherein each antenna element may for instance be a dipole, that are phased together, to name but a few non-limiting examples. For instance, this enables e.g. to create a narrow azimuth/horizontal patterns. Such a pattern refers to a radiation pattern or antenna pattern that is a graphical representation of one or more radiation properties of the respective one or more antenna element as a function of space. Thus, such an antenna pattern may for instance describe how the respective one or more antenna elements radiate energy out into space, e.g. to be received by further one or more antenna elements located physically away from the one or more antenna elements. Further, each of such columns of one or more antenna elements may for instance be a phased linear (antenna) array.

The apparatus according to the first exemplary aspect of the present invention may for instance comprise an antenna array comprising a plurality (e.g. at least two) of such columns of antenna arrays. The plurality (e.g. at least two) of columns of antenna elements may for instance form a rectangular (antenna) array.

The at least one power amplifier is connected to at least one column of one or more antenna elements, so that e.g. one power amplifier supplies power to one column, wherein each column may for instance comprise at least one antenna element.

According to an exemplary embodiment of all exemplary aspects of the present invention, one radio frequency power storage device is coupled to one column of one or more antenna elements.

According to an exemplary embodiment of all exemplary aspects of the present invention, one dedicated means for storing radio frequency power supplies power to one column comprising one or more antenna elements.

Thus, one power amplifier supplies radio frequency power (via one radio frequency power storage device, as disclosed above) to one column of antenna elements, wherein such a column may for instance comprise one or more antenna elements. A plurality (e.g. at least two) of such columns of antenna elements may for instance enable or form an antenna array.

According to an exemplary embodiment of all exemplary aspects of the present invention, in case the apparatus comprises more than one column of antenna elements, the respective columns are spaced by a lambda-half spacing.

According to an exemplary embodiment of all exemplary aspects of the present invention, in case more than one column of antenna elements are formed, the respective columns are spaced by a lambda-half spacing.

In one example embodiment of all exemplary aspects such a spacing of the respective columns of antenna elements may for instance be a lambda-half (half of wavelength) spacing. In this way, it is enabled to achieve that a respective path from each (e.g. transmit) antenna element of the one or more antenna elements to each respective receive antenna element, allows for a single beam with limited sidelobes, e.g. to reduce interferences of the paths, to name but one non-limiting example. Further, such a lambda-half spacing enables that sidelobes are limited respectively reduced and/or minimized so that e.g. radiation of the respective antenna element in unwanted directions may for instance be reduced and/or minimized. It will be understood that lambda-half may for instance be considered to be a typical value. The present invention according to all exemplary aspects is not limited to any of such a specific antenna spacing. Other antenna spacing than a lambda-half spacing may for instance be suitable as well.

According to an exemplary embodiment of all exemplary aspects of the present invention, the at least one radio frequency power storage device is or comprises at least one of the following:
  i) cavity resonator;
  ii) coax cable;
  iii) super conductivity.

Such cavity resonators may for instance provide typically high quality factors Q so that the energy lost over storage time (e.g. per second) relative to the energy stored in the cavity is low. Quality factors Q as high as 24000 are known to be achievable for such cavity resonators, but even quality factors as high as 1000 to 2000 may for instance be difficult for realization. It can be calculated that for a radio frequency bandwidth of e.g. 100 MHz, a radio frequency of 3.5 GHz (e.g. as used by a LTE signal) and a quality factor Q of 2000, the at least one radio frequency storage device may for instance store the radio frequency power for 4 samples of 6.6 ns equaling over 27 ns with a power loss less than 1 dB.

In the following, considerations regarding the typical power losses and achievable quality factors Q as well as other related information are disclosed:
  for conventional coax cables, the typical loss is mentioned to be 0.1 dB/m, so that e.g. a 300 m cable with a 1 µs storage time would result in a 30 dB power loss. Such a factor of 1000 smaller power after storage over 1 µs is obviously not sufficient for the present invention;
  best in class cables may for instance achieve 0.004 dB/foot power loss, which is about 0.01 dB/m or dB power loss per 1 µs storage time. Such cables would be therefore in principle an option for the at least one radio frequency storage device, for example by reducing the storage time to 100 ns would result in just 0.3 dB storage loss;
  super conductivity achieves quality factor as high as $Q=5\times10^{10}$, but require for the cooling immense energy (so far);
  reported quality factors Q for cavity resonators for example have a value of approx. 4550 at 26 GHz, where $Q=\omega$ (energy stored/energy lost per second)=$2\pi$ (energy stored/energy lost per cycle). Known solutions that tried to optimize quality factors report even unloaded Q at 5 to 10 GHz as high as 24000.

Such a cavity resonator comprises or contains a radio frequency cavity, e.g. comprising or consisting of a closed (or largely closed) metal structure that confines electromagnetic fields (e.g. the one or more radio frequency signals) in the respective region of the spectrum. Such a structure may for instance either be hollow or filled with dielectric material or gases.

According to an exemplary embodiment of all exemplary aspects of the present invention, a switch device coupled to each of the one or more antenna elements and/or to the at least one column of antenna elements that enables to switch a certain antenna element of the one or more antenna elements or the at least one column of antenna elements on and/or off.

According to an exemplary embodiment of all exemplary aspects of the present invention, the method further comprises:
  switching a certain antenna element of the one or more antenna elements or at least one column of antenna elements on and/or off.

Such a switch device respective means for switching a certain antenna element of the one or more antenna elements or at least one column of antenna elements on and/or off may for instance be a positive intrinsic negative (PIN) diode.

In case such one or more PIN diodes represent the switch device or switch devices (or one or more means for switching a certain antenna element of the one or more antenna elements or at least one column of antenna elements on and/or off), a massive MIMO antenna respective antenna array may then be considered to be a variant of a constrained radio frequency chain. Such constrained 1-bit on/off switching massive MIMO antennas respective antenna arrays are considered to be quite effective and enable results very close to unconstrained radio frequency frontends.

The apparatus according to the first exemplary aspect of the present invention may for instance comprise means across each of the one or more antenna elements to switch a certain antenna element of the one or more antenna elements on or off. For instance, such means may be one or more PIN diodes, as disclosed above.

Further, such massive MIMO antennas respective antenna arrays have a need for a provision of an advanced sleeping mode, in which antenna elements might be switched off if not needed in low load situations. For instance, in case a lower number of antenna elements provide already sufficient beamforming gains, some antenna elements may for instance be switched off.

Besides simple switching off of a slot antenna, in case the one or more antenna elements are in the form of one or more slot antennas, variably damped PIN diodes may for instance be used. Even so the PIN diodes have a non-linear characteristic that way a more flexible massive MIMO antenna respective antenna array can be constructed by suitably controlling the PIN diode voltage and current. Further, the control unit may for instance be configured and/or adapted to perform and/or control the switch device or switch devices, or the means for switching a certain antenna element of the one or more antenna elements or at least one column of antenna elements on and/or off. Alternatively or additionally, the control unit may for instance be configured and/or adapted to perform and/or control the PIN diodes, in case such PIN diodes are comprised by the apparatus according to the first exemplary aspect of the present invention.

According to an exemplary embodiment of all exemplary aspects of the present invention, wherein the at least one radio frequency power storage device comprises a containment for storing radio frequency power, wherein the containment is being achieved by at least two gases with different diffraction coefficients, wherein the at least two gases are separated by means for separating the at least two gases.

The at least one radio frequency storage device may for instance comprise a containment being achieved by at least two gases with different diffraction coefficients. The two different diffraction coefficients are a result of different dielectric constant values of the gases. The (achieved) wave guiding effect is then similar to that of mono mode optical fibers used in laser communication or diffraction at the ionosphere as known from short wave global communication. The two gases may for instance have to be separated, e.g. by a thin foliage (e.g. Teflon foliage, to name but one non-limiting example). Such a foliage may for instance have the thickness of just 130 micro meter or less. The thickness may for instance be well below the wavelength of the radio frequency. The antenna array itself is then again based on e.g. copper so that e.g. PIN diodes can be placed properly. Depending on the ratio of the volume for the copper antenna array and the gaseous storage part the combined quality factor can be significantly increased.

The table below provides a table of gases, which may for instance be suitable and be used as gases in exemplary embodiments according to all aspects of the present invention. The listed gases respectively combination of two of the listed gases enable that a sufficient difference in the diffraction coefficients can be achieved. Further, the listed gases respectively combination of two of the listed gases enable that one or more radio frequency waves respectively signals are indeed guided with reduced, at best minimum losses.

The values of $(n-1) \times 10^6$ for the gases at 0° C. and 760 Torr are as follows:

| | |
|---|---|
| Dry $CO_2$ free air | 288.13 ± 0.05 |
| Argon | 277.48 ± 0.05 |
| Carbon dioxide | 495.16 ± 0.08 |
| Helium | 34.51 ± 0.05 |
| Hydrogen | 135.77 ± 0.05 |
| Nitrogen | 293.81 ± 0.07 |
| Oxygen | 266.95 ± 0.05 |

Another related aspect is the break through power that can be achieved, but with 1 MW/m maximum break through power for air even for waveguide dimensions of about 0.05 m a Tx-power of about 50 kW would be possible.

A more elaborated radio frequency power storage device may for instance be based on the lossless diffraction of guided radio frequency waves due to different gases with different diffraction indices based on different dielectric constants. Such a radio frequency storage device may for instance avoid the otherwise unavoidable skin effect. This may for instance enable high quality factors and higher overall PAE of the whole radio frequency chain setup.

In addition or alternative, such radio frequency wave guiding cables more or less avoiding the skin effect might be used also for other applications. For instance, this might be the case if the one or more antenna elements of a base station (e.g. gNodeB) are placed far away from the baseband unit. For conventional best in class copper cables then several dB of loss are unavoidable due to the distance. This drawback can be avoided by the solution according to the present invention.

According to an exemplary embodiment of all exemplary aspects of the present invention, the one or more antenna elements or the at least one column of antenna elements form respectively forms a massive MIMO system for transmitting the one or more signals to one or more mobile devices.

Such at least one radio frequency storage device may for instance be utilized and/or used by the apparatus according to the first exemplary aspect of the present invention. Additionally or alternatively, such at least one radio frequency storage device may for instance be utilized and/or used by one or more other applications. In particular, such at least one radio frequency storage device may for instance be utilized and/or used to supply (radio frequency) power to one or more antenna arrays, e.g. one or more MIMO antenna arrays (e.g. one or more massive MIMO antenna arrays respectively systems).

Such a massive MIMO system, or massive MIMO antenna respectively antenna array achieves a better efficiency, e.g. by combining antenna elements in the antenna array in such a way that one or more radio frequency signals at particular angles experience constructive interference while others experience destructive interference. In this way, in particular beamforming is enabled. Such beamforming can be used e.g. at both the transmitting and receiving ends in order to achieve spatial selectivity. Compared with e.g. omnidirectional reception/transmission, improvement is achieved since the directivity of the array or change of the directionality of the array when transmitting, a pattern of constructive and destructive interference in the one or more radio frequency signals is created. This may for instance be done by a so-called beamformer, e.g. enabled by the control unit that controls e.g. the phase and relative amplitude of the one or more radio frequency signals at each transmitter (for transmitting the one or more radio frequency signals via the one or more antenna elements), in order to create a pattern of constructive and destructive interference in the one or more radio frequency signals. Further, it is enabled while maintaining full beamforming gains.

According to an exemplary embodiment of all exemplary aspects of the present invention, the stored radio frequency power of the at least one radio frequency power storage device is output corresponding to a demand of the one or more antenna elements.

According to an exemplary embodiment of all exemplary aspects of the present invention, at least one antenna element of the one or more antenna elements is at least one slot antenna.

Such slot antennas, in case the one or more antenna elements are in the form of one or more slot antenna. Such slot antennas may be placed suitably with respect to the standing wave power in the radio frequency power storage device (e.g. storage cavity). By placing the excess points shifted e.g. by a quarter of a wavelength (e.g. lambda-quarter) relative to the standing wave, IQ signals are enabled. For instance, it may for instance be possible to include beside amplitude also phase variations per massive MIMO antenna element. Such a respective slot antenna may for instance enable controllable outlets of the at least one radio frequency power storage device by placing the slots of suitable size (e.g. suitable for a 3.5 GHz LTE signal) in the radio frequency cavity of the at least one radio frequency power storage device, to name but one non-limiting example.

Additionally or alternatively, in case of one or more slot antennas, PIN diodes are proposed. Typical reported insertion loss for reflective switches are about 1.2 dB (for attenuator about 2 to 3 dB). Typical switching time is 100 ns, but also faster switching times are possible, and the maximum input power per PIN diode is typically 200 mW or 23 dBm. For a massive MIMO 256 antenna element array, the achievable sum power would then be 23 dBm+10×$\log_{10}$(256)=47 dBm.

According to an exemplary embodiment of all exemplary aspects of the present invention, a circulator couples the radio frequency power (e.g. energy) of the at least one power amplifier into the radio frequency power storage device (e.g. cavity resonator). Additionally or alternatively, also a bended form for the waveguide with a leakage effect may for instance be used for coupling of radio frequency power (e.g. energy) into the at least one radio frequency power storage device (e.g. one or more cavities, one or more cavity resonators, to name but a few non-limiting examples).

According to an exemplary embodiment of all exemplary aspects of the present invention, the method further comprises:

transmitting the one or more radio frequency signals via the one or more antenna elements or the at least one column of antenna elements for to one or more mobile devices.

According to an exemplary embodiment of all exemplary aspects of the present invention, the one or more antenna elements or the at least one column of antenna elements form respectively forms a massive MIMO system for transmitting the one or more signals to one or more mobile devices.

One or more power amplifiers and a set of e.g. fast controllable PIN diodes, switching on and off certain antenna elements (e.g. slot antennas) of the one or more antenna elements, and at least one radio frequency power storage device may for instance provide simultaneously a storage function as well as a power distribution network to all antenna elements of the one or more antenna elements may for instance be comprised by the apparatus according to the first exemplary aspect of the present invention. Antenna elements in conventional design may for instance be a source of large power losses by itself.

In this way, new levels of PAE—and especially better than 50%—are possible under the assumption of the proper implementation according to the exemplary aspects and embodiments as disclosed.

Optimum Tx-power adaptation to network load conditions without sacrificing beamforming capabilities as otherwise usual for radio frequency chain deactivation concepts. This has advantages as is maximizes the power saving compared to solutions where the beamforming gains will suffer from a reduced number of active antenna elements of the one or more antenna elements.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
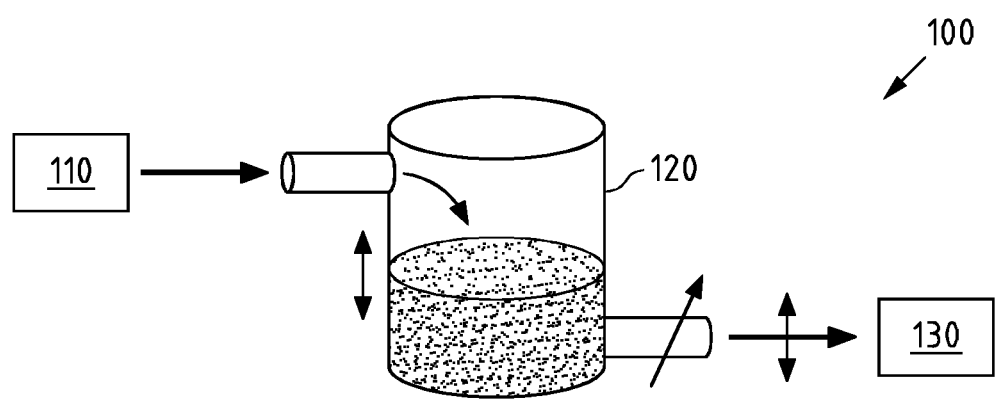
FIG. 1 a schematic block diagram of a first embodiment of an apparatus according to an exemplary aspect of the present invention.

FIG. 1 shows a schematic block diagram of a first embodiment of an apparatus according to an exemplary aspect of the present invention.

FIG. 1 schematically illustrates the principle as enabled by the present invention. Describing FIG. 1, an analogy to a water storage system is used in the following. In the FIG. 1, the storage (radio frequency power storage device 120) is constantly refilled by some (relatively) constant water flow (e.g. power supplied by a power amplifier 110) with a rate e.g. depending on the average ratio of depletion. Thus, flow of water (stored radio frequency power) out of the radio frequency storage device 120 can be varied according to a demand of the antenna array 130. The depletion ratio depends e.g. on the water respective radio frequency power needed at the outlet connecting the radio frequency storage device 120 to the antenna array 130, which might vary on a faster time scale. Due to the intermediate storage by the radio frequency power storage device 120, the "filling ratio" (power supplied by the power amplifier 110) can then be adapted to the average depletion ratio and does not have to follow directly to the variations at the outlet.

Due to the used analogy, instead of water flows, the solution according to the present invention proposes to consider a (radio frequency) power amplifier 110 at the input of a radio frequency-power storage device 120 and Tx-antennas respectively an antenna array 130 comprising such Tx-antennas as the outlets of the radio frequency storage device 120. The benefit of such a system respectively apparatus 100 is that the power amplifier 110 at the input of the radio frequency power storage device 120 can run e.g. in full power mode with highest PAE and the output power of this power amplifier 110 is only adapted on lower time scale e.g. to the average variations of the overall transmit power (that is supplied by the radio frequency-power storage device 120 according to a power demand of the antenna array 130) of all antenna elements comprised by the antenna array 130 compared to power output variations on the output side (which may for instance be on a higher time scale). That way, it is enabled to avoid the need e.g. for a (fast) envelope tracking linearization circuit, which becomes very challenging for very high radio frequency bandwidth signals, as the envelope tracking typically has to be done with a certain oversampling factor.

Furthermore, in case of an ideal radio frequency power storage device and a power amplifier with (almost) perfect PAE as it is typically possible for a constant power single radio frequency carrier transmission, then—at least theoretically—the overall PAE of the system respectively apparatus 100 can be significantly improved over state of the art solutions. In addition, in case of varying network load conditions—for example due to varying number of mobile device (e.g. User Equipments; UEs) or due to varying channel conditions, to name but a few non-limiting examples—the power of the power amplifier at the radio frequency power storage device input can be adapted similarly. That way the general antenna characteristics like beamforming gain, number of active antenna elements or bean patterns will remain constant, while only the mean Tx-power is accordingly adapted and minimized. This enhances known solutions since in conventional solutions, where often a part of the radio frequency chains will be switched off in case of lower network load conditions (to reduce power consumption), a drawback that comes with this are varying beam patterns, which then need then some further means to enable the necessary beam patterns.

Figure 2:
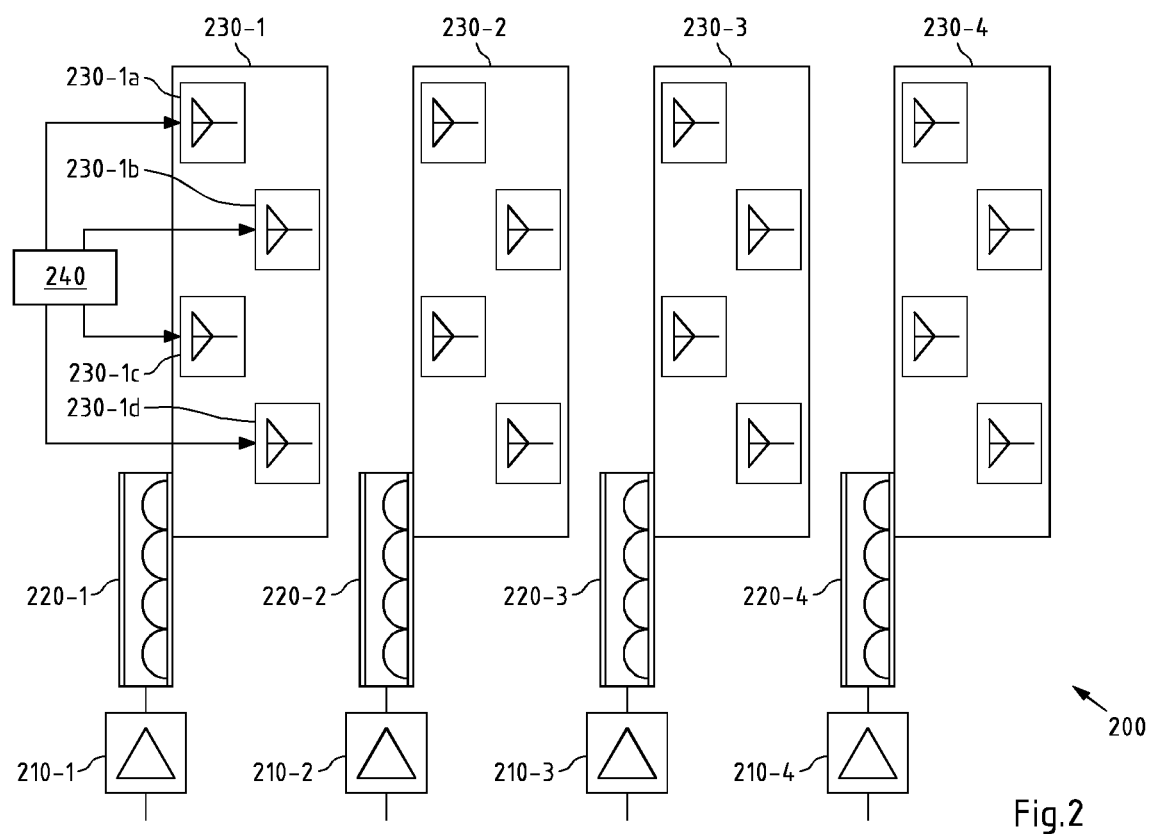
FIG. 2 a schematic block diagram of a second embodiment of an apparatus according to an exemplary aspect of the present invention.

FIG. 2 shows a schematic block diagram of a second embodiment of an apparatus according to an exemplary aspect of the present invention.

FIG. 2 illustrates a high-level block diagram of a possible implementation based on one single power amplifier 210-1 to 210-4 per column 230-1 to 230-4 of antenna elements 230-1a-d, 230-2a-d, 230-3a-d, and 230-4a-d. The power amplifiers 210-1 to 210-4 provide either constant Tx-power of e.g. a 3.5 GHz radio frequency (to name but one non-limiting example), or is adapted on a lower time scale e.g. to the average Tx-power of the TX-signals of all antenna elements. The power amplifiers 210-1 to 210-4—for example one per column 230-1 to 230-4 of antenna elements—are connected each to a radio frequency power storage device 220-1 to 220-4 (e.g. a radio frequency storage cavity), wherein each of the radio frequency power storage devices 220-1 to 220-4 may for instance be cavity resonator.

Figure 3:
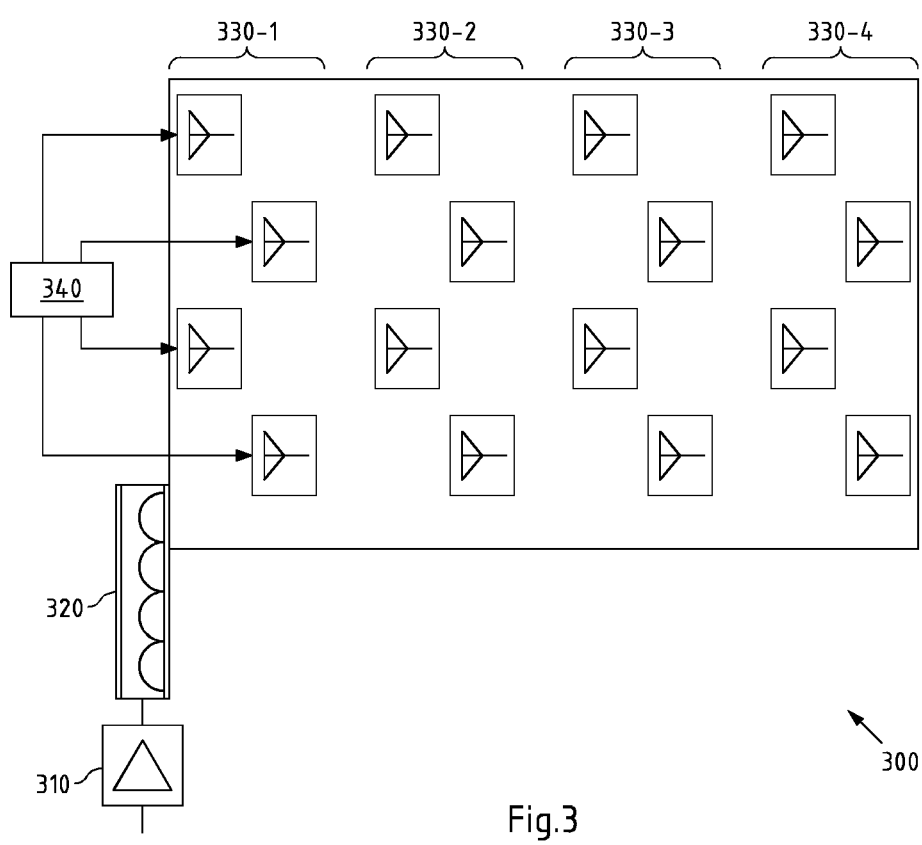
FIG. 3 a schematic block diagram of a third embodiment of an apparatus according to an exemplary aspect of the present invention.

FIG. 3 shows a schematic block diagram of a third embodiment of an apparatus according to an exemplary aspect of the present invention.

In comparison to FIG. 2, e.g. as a further optimization, a larger cavity with a larger volume compared to the surface is used. As a result, the relation of power dissipation at the surface e.g. due to the skin effect related to the stored radio frequency power by the cavity can be reduced respectively minimized.

The columns 330-1 to 330-4 of antenna elements are spaced by lambda half spacing. The antenna elements comprised by the respective columns 330-1 to 330-4 may for instance be controllable, e.g. by the control unit 340. Stored radio frequency power of the radio frequency storage device 320 can be supplied to the respective columns 330-1 to 330-4 of antenna elements and/or antenna elements based at least partially on a power demand of the columns 330-1 to 330-4 of antenna elements and/or antenna elements.

Figure 4:
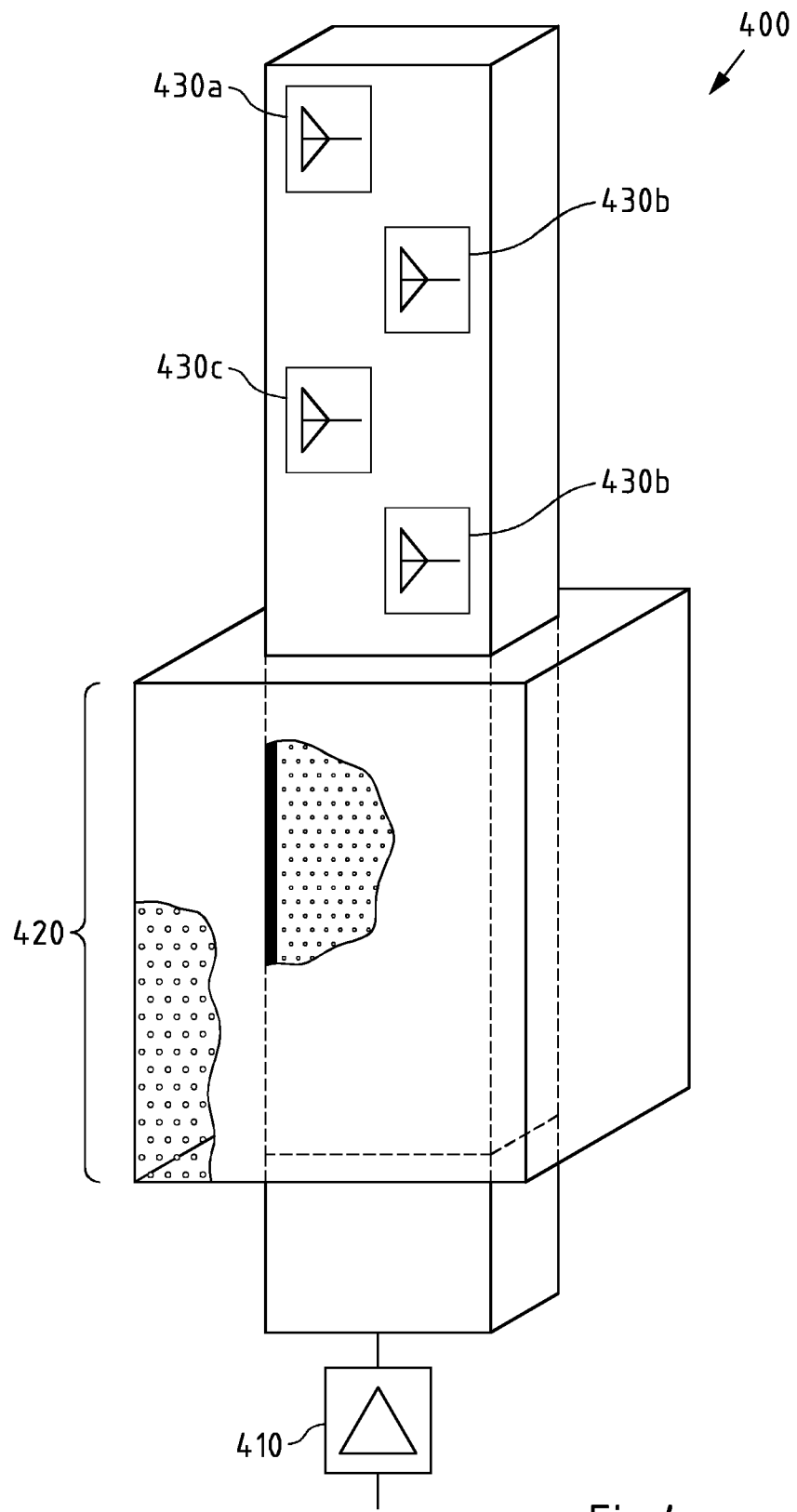
FIG. 4 a schematic block diagram of a fourth embodiment of an apparatus according to an exemplary aspect of the present invention.

FIG. 4 shows a schematic block diagram of a fourth embodiment of an apparatus and/or a radio frequency power storage device according to an exemplary aspect of the present invention.

Figure 5:
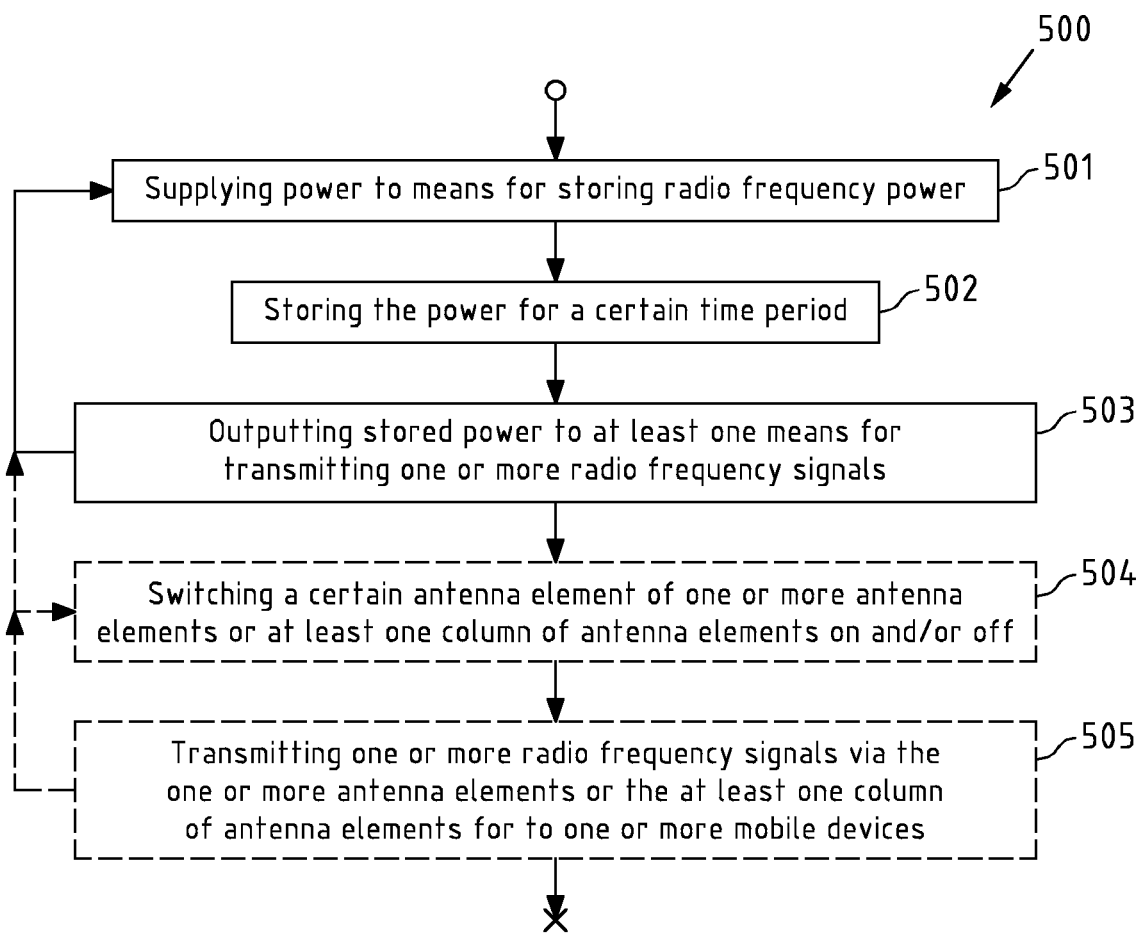
FIG. 5 a flowchart showing an example embodiment of a method according to the second exemplary aspect of the present invention.

The radio frequency power storage device 420 shown in FIG. 5 comprises a radio frequency power containment, which comprises two gases with different diffraction coefficients $n_1$ and $n_2$. The two gases have different diffraction coefficients $n_1$ and $n_2$ due to different dielectric constant values of the gases. Gases, which can be used, are disclosed in the summary section of this specification. Due to the two gases, the wave guiding effect of the radio frequency power storage device 120 is then similar to that of mono mode optical fibers, e.g. used in laser communication or diffraction at the ionosphere in short wave global communication. The two gases have to be separated from each other, e.g. by a (e.g. thin) Teflon foliage. The thickness may for instance be below the wavelength of the radio frequency, thus, e.g. equal to or below 130 µm. The apparatus 400 of FIG. 4 comprises an antenna array 430 with the antenna elements 430a-d. Of course, such an antenna array 430 may for instance comprise more or less than the exemplary shown four antenna elements 430a-d. The antenna array 430 of the exemplary embodiment shown in FIG. 4 is based on copper, and comprises e.g. PIN diodes for switching a respective antenna element on or off. By being based on copper, such PIN diodes are enabled to be placed correctly for enabling the switching. Depending on the ratio of the volume of the copper antenna array 430, and the gaseous radio frequency power storage device, a combined quality factor which is significantly improved over known solution can be achieved, as disclosed in the above summary section of this specification.

FIG. 5 is a flowchart 500 showing an example embodiment of a method according to the second exemplary aspect of the present invention. This flowchart 500 may for instance be performed by a base station.

In a first step 501, power is supplied to means for storing radio frequency power (e.g. a radio frequency storage device 120 of FIG. 1). The power is supplied from means for amplifying power (e.g. a power amplifier 110 of FIG. 1) to the means for storing radio frequency power.

In a second step 502, the power may for instance be stored for a certain time period, in case it is necessary respectively required. The power is stored e.g. by the means for storing radio frequency power.

In a third step 503, the stored power is output to at least one means for transmitting one or more radio frequency signals (e.g. one or more antenna elements, e.g. antenna array 130 of FIG. 1). In case, e.g. based on a demand of power by the antenna array, it is not necessary to store the power for a certain period of time, it will be understood that the power may for instance be directly supplied respectively output (e.g. via the means for storing radio frequency power) to the at least one means for transmitting the one or more radio frequency signals.

In an optional fourth step 504, a certain means for transmitting one or more radio frequency signals (e.g. an antenna element of the one or more antenna elements or at least one column of antenna elements, or an antenna array, or at least one column of the antenna array) is switched on and/or off. In this way, the power demand may for instance be significantly reduced. Further, the power demand may for instance be varied respectively adapted according to a load situation of the means for transmitting the one or more radio frequency signals.

In an optional fifth step 505, one or more radio frequency signals are transmitted, e.g. by at least one of the antenna elements 230-1a-d, 230-2a-d, 230-3a-d, and 230-4a-d of FIG. 2. For transmitting the one or more radio frequency signals, the means for transmitting the one or more radio frequency signals are supplied with power stored by the means for storing radio frequency power, e.g. via outlets connecting the means for transmitting the one or more radio frequency signals with the means for storing radio frequency power. The stored radio frequency power may for instance be supplied to the means for transmitting the one or more radio frequency signals at least partially based on a power demand from the respective means for transmitting the one or more radio frequency signals. Such one or more radio frequency signals may for instance be a plurality of e.g. LTE signals to be transmitted to a plurality of mobile devices (e.g. smartphones, tablets, wearables, IoT-devices, to name but a few non-limiting examples). As described with respect to optional step 504, means for transmitting the one or more radio frequency signals that are currently not required to be supplied with power may for instance be switched off.

It will be understood that at least some of the steps 504 to 505 may for instance be performed and/or controlled in parallel or in sequence to any of the steps 501 to 502. For instance, step 504 may for instance be performed and/or controlled prior, in parallel and/or subsequent to any of the respective steps 501 to 503. Furthermore, it will be understood that step 501 of supplying power may for instance be performed while performing at least some of the other steps 502 to 505 as well. The same applies to the steps 502 and 503. This is indicated in FIG. 5 by the arrows pointing backwards from one step to one or more of the previous steps, e.g. from step 504 pointing to the steps 501, 502, and 503. Further, any of the steps 501 to 505 may for instance be performed and/or controlled a plurality of times (e.g. at least twice).

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus, comprising:
at least one power amplifier coupled to at least one radio frequency power storage device, wherein the at least one power amplifier is configured to supply power to the at least one radio frequency power storage device, wherein the at least one power amplifier is configured to provide power to be used to amplify one or more radio frequency signals;
wherein the at least one radio frequency power storage device is configured to store the power of the at least one power amplifier for a certain time period; and
one or more antenna elements coupled to the at least one radio frequency power storage device, wherein the at least one radio frequency power storage device is configured to output stored power to at least one of the one or more antenna elements, wherein the power is output variably dependent upon a power demand of a required radio frequency power and/or amplitude needed to transmit the one or more radio frequency signals, wherein the power demand represents a power demand of the at least one antenna element to which the power is to be output.

2. The apparatus according to claim 1, wherein the at least one power amplifier is configured to supply a constant power input to the at least one radio frequency power storage, wherein the power input is constant at least for a pre-determined or determined to pre-defined rules time interval.

3. The apparatus according to claim 1, wherein each of the one or more radio frequency signals is configured to be transmitted based on one or more symbols.

4. The apparatus according to claim 3, wherein the at least one radio frequency power storage device is configured to enable storing of power for one or more symbols for a certain time duration.

5. The apparatus according to claim 1, wherein the at least one power amplifier is configured to supply constant radio frequency power at least partially based on an average power demand of the one or more antenna elements.

6. The apparatus according to claim 1, wherein at least a part of the one or more antenna elements forms at least one column of antenna elements, which are coupled via the at least one radio frequency power storage device to the at least one power amplifier.

7. The apparatus according claim 6, wherein one radio frequency power storage device is coupled to one column of one or more antenna elements.

8. The apparatus according to claim 6, wherein when the apparatus comprises more than one column of antenna elements, the respective columns are spaced by a lambda-half spacing.

9. The apparatus according to claim 1, wherein the at least one radio frequency power storage device comprises at least one of the following:
   i) cavity resonator;
   ii) coax cable;
   iii) super conductivity.

10. The apparatus according to claim 1, wherein a switch device coupled to each of the one or more antenna elements or the at least one column of antenna elements is configured to enable to switch a certain antenna element of the one or more antenna elements or the at least one column of antenna elements on and/or off.

11. The apparatus according to claim 1, wherein the at least one radio frequency power storage device comprises a containment for storing radio frequency power, wherein the containment is achieved by at least two gases with different diffraction coefficients, wherein the at least two gases are separated by separating separation device configured to separate the at least two gases.

12. The apparatus according to claim 1, wherein the one or more antenna elements or the at least one column of antenna elements forms a massive MIMO system configured to transmit the one or more signals to one or more mobile devices.

13. A method, comprising:
   supplying power to storing storage device configured to store radio frequency power, wherein the stored radio frequency power is to be used to amplify one or more radio frequency signals;
   storing the power for a certain time period; and
   outputting stored power to at least one transmitter configured to transmit the one or more radio frequency signals, wherein the power is output variably dependent upon a power demand of a required radio frequency power and/or amplitude needed to transmit the one or more radio frequency signals, wherein the power demand represents a power demand of the at least one transmitter to which the power is to be output.

14. The method according to claim 13, further comprising:
   switching a certain antenna element of the one or more antenna elements or at least one column of antenna elements on and/or off.

15. The method according to claim 13, further comprising:
   transmitting the one or more radio frequency signals via the one or more antenna elements or the at least one column of antenna elements to one or more mobile devices.

16. An apparatus, comprising:
   at least one processor; and
   at least one memory including computer program code, said at least one memory and computer program code being configured, with the at least one processor, to cause the apparatus to perform and/or control the method according to claim 13.

17. A system, comprising:
   at least one apparatus according to claim 1; and
   at least one mobile device, wherein the at least one mobile device is configured to receive one or more signals output by the at least one apparatus.

18. A radio frequency power storage device for at least one power amplifier for an antenna array, said radio frequency power storage device comprising a containment for storing radio frequency power, wherein the containment is achieved by at least two gases with different diffraction coefficients, wherein the at least two gases are separated by separating separating device configured to separate the at least two gases.

19. The radio frequency power storage device according to claim 18, wherein the radio frequency power storage device comprises:
   at least one power amplifier, wherein the at least one power amplifier is configured to supply power to the at least one radio frequency power storage device, wherein the at least one power amplifier is configured to provide power to be used to amplify one or more radio frequency signals;
   wherein the at least one radio frequency power storage device is configured to store the power of the at lest one power amplifier for a certain time period; and
   one or more antenna elements coupled to the at least one radio frequency power storage device, wherein the at least one radio frequency power storage device is configured to output stored power to at least one of the one or more antenna elements, wherein the power is output variably dependent upon a power demand of a required radio frequency power and/or amplitude needed to transmit the one or more radio frequency signals, wherein the power demand represents a power demand of the at least one antenna element to which the power is to be output,
   wherein the radio frequency power storage device is configured to supply power to a storage device configured to store radio frequency power, wherein the stored radio frequency power is to be used to amplify one or more radio frequency signals;
   store the power for a certain time period; and
   output stored power to at least one transmitter configured to transmit the one or more radio frequency signals, wherein the power is output variably dependent upon a power demand of a required radio frequency power and/or amplitude needed to transmit the one or more radio frequency signals, wherein the power demand represents a power demand of the at least one transmitter to which the power is to be output.

20. A system, comprising:
   at least one apparatus according to claim 16; and
   at least one mobile device, wherein the at least one mobile device is configured to receive one or more signals output by the at least one apparatus.

* * * * *